United States Patent [19]

Buchanan

[11] Patent Number: 5,165,443
[45] Date of Patent: Nov. 24, 1992

[54] DOUBLE BLOCK AND VENT VALVE SYSTEM WITH IMPROVED FLOW HANDLING FEATURE

[75] Inventor: Joseph R. Buchanan, Portland, Conn.

[73] Assignee: ITT Corporation, New York, N.Y.

[21] Appl. No.: 759,255

[22] Filed: Sep. 13, 1991

[51] Int. Cl.[5] ............................................. F16K 1/44
[52] U.S. Cl. .................................. 137/312; 137/627.5; 137/630.22
[58] Field of Search ................. 137/312, 627.5, 630.19, 137/630.22

[56] References Cited

U.S. PATENT DOCUMENTS 4,798,223  1/1989  Mitchell ............................. 137/312

Primary Examiner—Robert G. Nilson
Attorney, Agent, or Firm—Menotti J. Lombardi

[57] ABSTRACT

A double block and vent valve comprises a housing having an inlet and an outlet for introducing and discharging fluid to and from the valve and is defined at its ends by a first portion and an opposite second portion. The valve includes a flow directing throat disposed within the housing and interposed between the inlet and the outlet for communicating fluid therethrough and has a means for venting leached or trapped fluid externally of it. The flow directing throat has a flow discharging end portion associated with the housing first portion and has an opposite flow receiving end portion associated with the housing second portion. The flow receiving end portion and the discharging end portion of the flow directing throat are sized diametrically differently relative to one another such that fluid flow passing through the flow directing throat from the inlet to the outlet does so without substantially impeding its flow path.

22 Claims, 4 Drawing Sheets

DOUBLE BLOCK AND VENT VALVE SYSTEM WITH IMPROVED FLOW HANDLING FEATURE

CROSS REFERENCE TO RELATED APPLICATIONS

The present invention relates to U.S. application Ser. No. 118,602 filed on Nov. 9, 1987 entitled Double Block and Vent Valve, now U.S. Pat. No. 4,798,233, which patent being commonly owned by the assignee of the present invention, ITT Industries, Inc.

BACKGROUND OF THE INVENTION

The present invention resides in an improved double block and vent valve system wherein means are provided in the double block and vent assembly portion of the valve such that the fluid passing through the valve, and in particular through the assembly, does so without irs flow stream being substantially impeded by the configuration of the assembly.

In double block and vent valve systems, such as disclosed in aforementioned U.S. Patent No. 4,798,223, valves using cages in which upper and lower plugs coact against annularly extending inwardly directed shoulders are known. This arrangement is often quite acceptable and effective for sealing the valve against fluid leaching when the plugs are in a closed to flow condition. Such valves have found successful application in power plants wherein the double block and vent feature insures safe and controlled delivery of combustible fluids to the burners. In such applications, the valves are made very large to accommodate the high volume of fluid needed to produced a desired burn. This makes any disruption in the flow path followed by the fluid through the valve less pronounced given the size of the obstruction taken relative to volume of fluid affected. However, in applications of the double block and vent valve system wherein the size of the valve and the volume of fluid passing through it is not as disproportionately large taken relative to any flow path obstruction that may exist, such as in the case of a valve which feeds fuel to the ignitor of a combustion chamber, the fluid flow path through the double block and vent assembly may experience heightened resistance to flow.

Additionally, in fuel burning systems of the type in which the present invention may be involved, safety standards set by code require the valve to contain seals preventing leaking of the fluid through moving or operational parts thereof. This requirement is important in power plant systems wherein the fluid is ignitable and must not communicate with electrical components of the valve thereby causing possible inadvertent ignition of the escaping pressurized fluid in the case where a seal fails or is partially failing. To this end, it is desirable to construct a valve such that any failure occurring at a seal interface is protected by a redundancy in the system such that the flammable fluid is vented exteriorly of the valve in a safe manner. Also, it is desirable to vent such leaching pressurized fluid or gas to atmosphere at a location remotely of the actuator component parts.

Notwithstanding, previously known double block and vent valve systems employ actuator means which are integrally formed with the valve housing. Often one of many different types of actuators may be called by specification to be used thereby presenting a need to form a valve capable of being generically mated with different types of actuators. In so doing, it is thus necessary to construct the valve as a self-contained apparatus sealed independently of its actuator and capable of being connected to any one of a number of different actuator types without fluid leaching from it.

Accordingly, it is an object of the present invention to provide a double block and vent valve system wherein the block and vent assembly does not substantially impede the path followed by fluid flowing through the valve.

It is a further object of the present invention to provide a valve of the aforementioned type wherein means are provided for producing a redundancy in the valve against leaching of fluid through seal interfaces existing between mechanically moving parts.

Still a further object of the present invention is to provide a valve of the aforementioned type being so constructed as to be self-contained relative to the actuator which articulates it between open and closed positions such that it can be generically mounted to any one of a variety of different type actuators.

It is still a further object of the present invention to provide a double block and vent valve system so constructed as to be capable of venting flammable fluids to atmosphere through a means provided in the valve for directing such escaping fluids away from the actuator which articulates it.

SUMMARY OF THE INVENTION

A double block and vent valve comprises a housing having an inlet and an outlet for introducing and discharging fluid to and from the valve and is defined at its ends by a first portion and an opposite second portion and includes a flow directing throat disposed within the housing and interposed between the inlet and the outlet for communicating fluid therethrough. The flow directing throat has a flow discharge end portion associated with the housing first portion and has an opposite flow receiving end portion associated with the housing second portion. A first plug means is disposed within the housing and is associated with the housing first portion for coengaging with the discharge end portion of the flow directing throat and for controllably blocking fluid flow from the throat to the outlet. A second plug means is disposed within the housing and is associated with the housing second end portion for coengaging with the flow receiving end of the throat and for controllably blocking fluid flow from the inlet and into the flow receiving throat. A first biasing means is associated with the first plug means for urging it into blocking coengagement with the discharge end portion of the throat and a second biasing means is associated with the second plug means for urging it into blocking coengagement with the flow receiving end portion of the throat such that the flow receiving end portion and the discharge end portion of the flow directing throat are sized cross-sectionally differently relative to one another such that fluid flow passing through the flow directing throat from the inlet to the outlet does so without being substantially impeded when passing through said throat.

BRIEF DESCRIPTION OF THE PREFERRED EMBODIMENT

Figure 1:
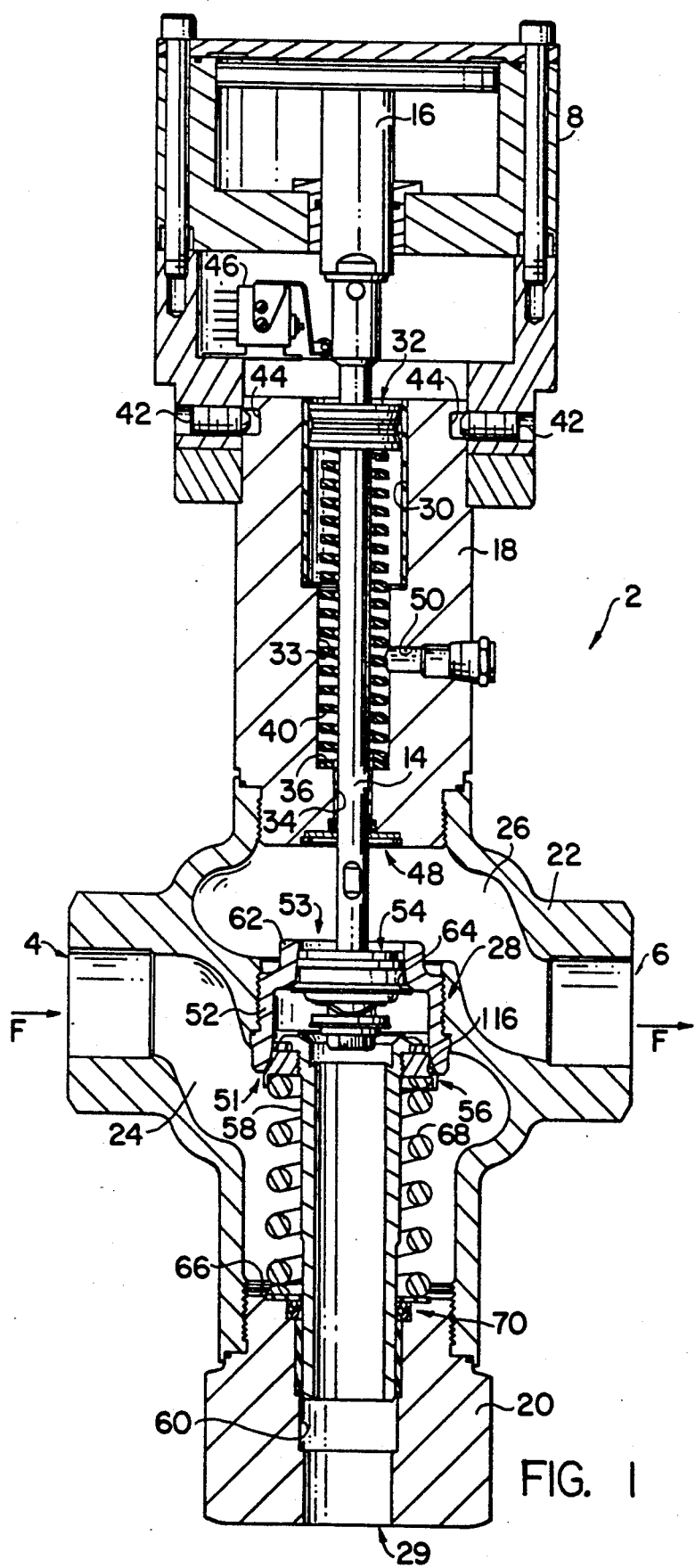
FIG. 1 is a vertical section through the valve of the present invention and through an illustrative actuator used in conjunction therewith depicting the double block vent in its closed no flow condition.
Figure 2:
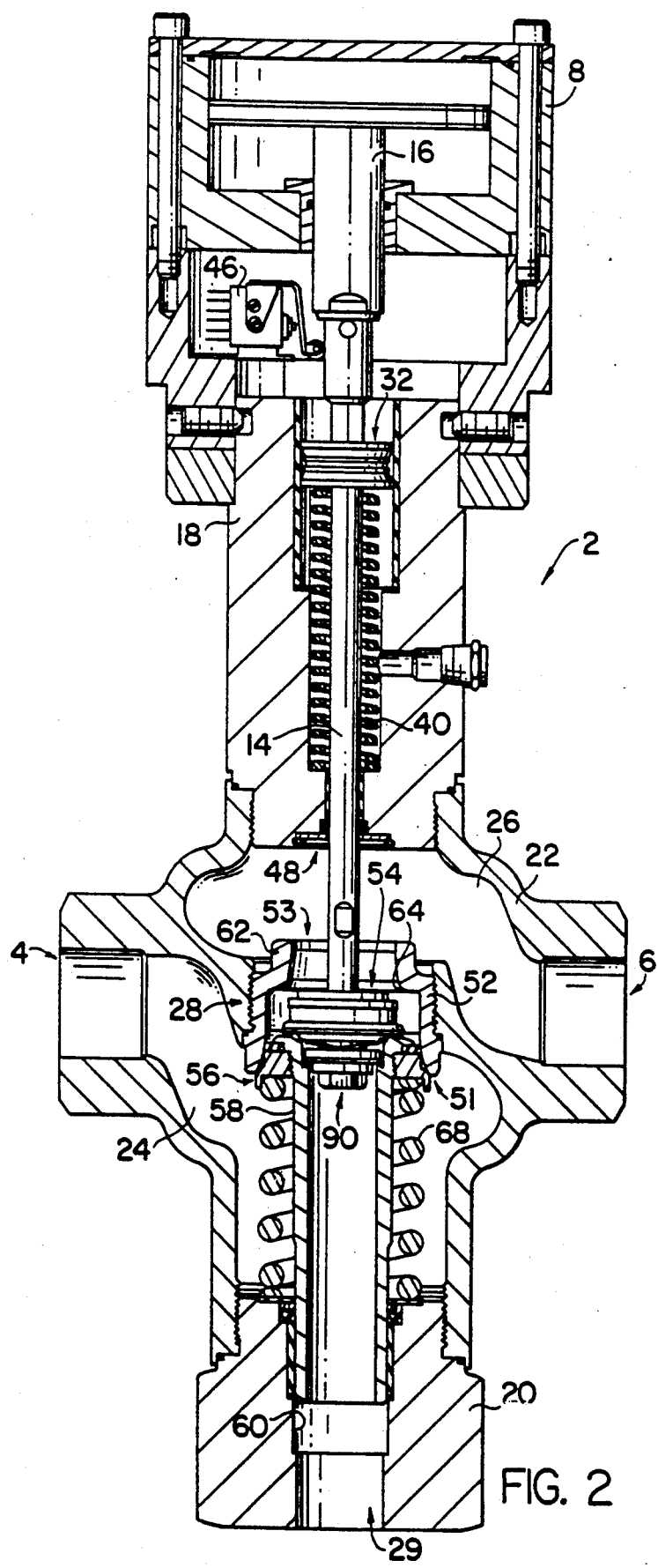
FIG. 2 is a vertical section showing the valve of FIG. 1 with its double block and vent assembly articulated to an intermediate stage between a full open and a full closed position.
Figure 3:
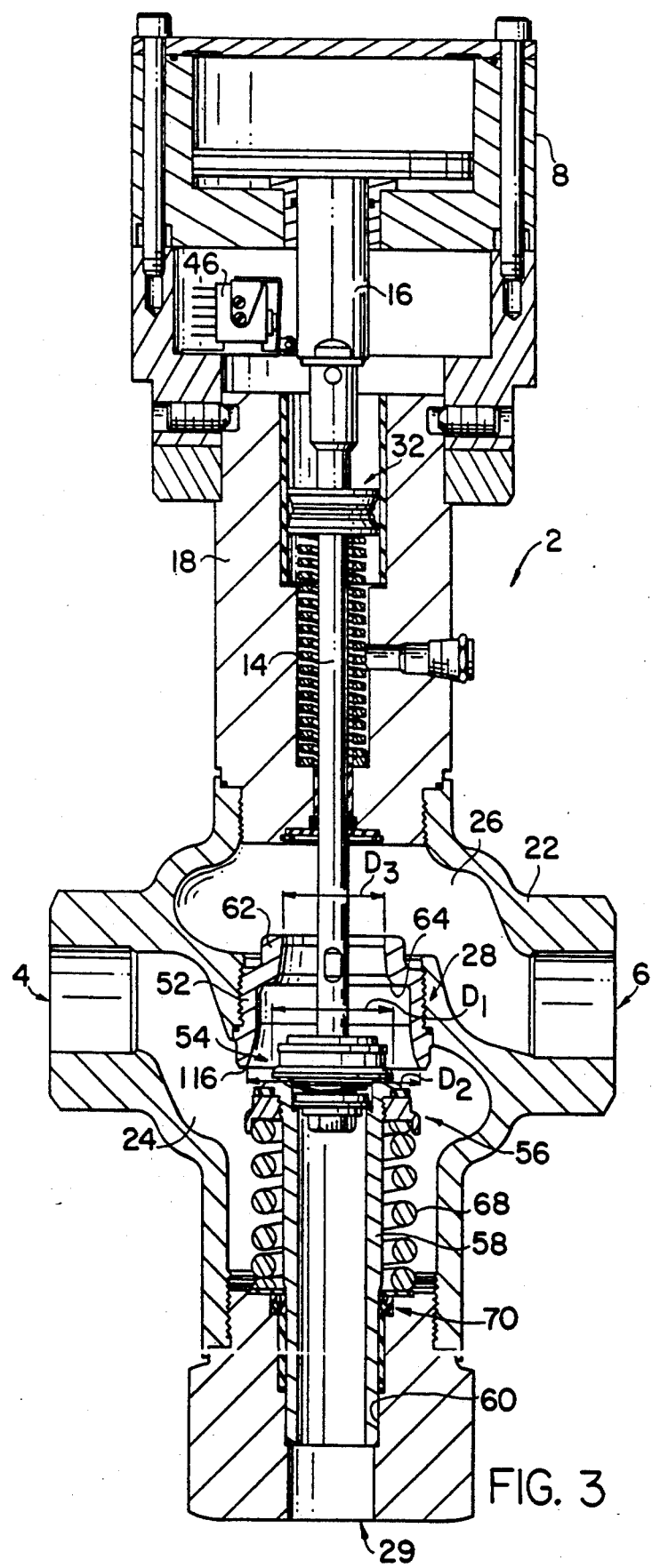
FIG. 3 is a vertical section of valve shown in FIG. 1 with the double block and vent assembly articulated to the fully open flow through position.

In FIGS. 1-3, a valve of the present invention is shown generally as 2 and includes a housing having an inlet 4 and an outlet 6 for communicating fluid into and out of the valve and to a next station along the flow path F. The inlet 4 and the outlet 6 are adapted to be readily connected to lines (not shown) which carry a given fluid to and away from the valve 2. The valve has a housing which is generally elongate and is defined by a first portion 18 and an opposite second portion 20 with the inlet and outlet ports 4 and 6 disposed therebetween on an intermediate housing portion 22. The intermediate housing portion 22 in accordance with the invention includes a double block and vent assembly 28, an inlet chamber 24 and outlet chamber 26 communicating respectively with each of the inlet and outlet ports 4,6. Each of the chambers is controllably confluent with one another through the intermediary of the double block and vent assembly 28 interposed therebetween. A vent means 29 associated with the second housing portion 20 is also provided for externally communicating trapped or leaked fluid from within the assembly 28.

Connected to the valve at the first housing portion 18 is an actuator 8 which upon controlled energization articulates the double block and vent assembly 28 through the intermediary of an elongate connecting member 14 disposed for sliding engagement within the first housing portion 18. In the illustrated example, the actuator 8 is a pneumatic type actuator with a piston rod 16 depending therefrom such that its lower tip contacts a upper abutment face on the connecting member 14. The actuator 8 is held against movement on the upper housing portion 18 of the valve 2 by a plurality of set screws or pins 42 threadably engaged on the actuator and received in corresponding recesses 44 formed in the first housing portion 18. The actuator 8 may further include a switch 46 having means which sense the translatory movement of the piston rod 16 as it is driven by a pneumatic fluid source. The switch 46 may be connected to a control system for the purpose of indicating the condition of the valve 2 in a larger system, such as in a power plant steam generator system.

Formed within the first housing portion 18 is a series of three stepped openings, the first of which 30 opens to the top end of the valve and is sized to receive in sliding engagement therewith a sealing piston member 32 secured against axial movement to the connecting member 14 at its upper end. The first opening 30 may be lined with a suitable coating, such as Teflon, for maintaining sealing engagement between the inner wall and the piston 32. The second opening 33 communicates with the first opening and combines with the third opening 34 to create an annular shoulder 36 at this interface. The second opening 33 is sized diametrically smaller than the first opening 30 so as to receive a helical compression spring 40 seated within the first housing portion 18 on the shoulder 36. The spring 40 is appropriately interiorly sized to fit and slide over the connecting member 14 such that the compression spring 40 coacts between the shoulder 36 and the sealing piston 32 to normally bias the connecting member 14 towards the actuator 8.

The third opening 34 is correspondingly sized diametrically for journalling the connecting member 14 in sliding engagement within the first housing portion 18 and includes for the purpose of dynamically sealing the lower end of the first housing portion 18 a seal means 48 disposed at the interface between the outlet chamber 26 and the third opening 34. The seal means 48 is adapted to cooperate against the outer surface of the connecting member 14 so as to allow relative sliding movement yet maintain a seal interface. Communicating between the second opening 33 and the external environment is a breather opening 50 extending generally transversely therebetween through the upper housing portion 18. The breather opening 50 permits free passage of air flow between the sealed chamber defined by the series of first, second and third openings and atmosphere thereby permitting the piston 32 to move axially without resistance to air trapped or evacuated therein. This arrangement introduces a desirable safety feature to the system in that should the seal means 48 fail, the sealing piston 32 will nevertheless prevent escapement of fluid through the upper housing portion 18, and rather cause the escaping fluid to be redirected out the breather opening 50.

The vent means 29 provided for communicating leached or trapped fluid from within the double block and vent assembly 28 externally of the valve includes a hollow vent shaft 58 received for sliding engagement within a correspondingly sized and shaped opening 60 formed in the second housing portion 20 aligned axially with the connecting member 14. The lower housing portion 20 includes a second seal means 70 disposed adjacent its upper end face 66 for sealing engagement with the outer surface of the shaft 58 while nevertheless permitting it to slide axially within the opening 60. For journalling the shaft for movement in this manner, a portion of the length of the opening 60 is provided with a bearing surface, such as Nylon, for effecting sliding engagement therebetween. Seated against the surface 66 of the second housing portion 20 is a second compression spring 68 diametrically sized interiorly of its turns to be telescopically disposed outwardly about the shaft 58. The vent shaft 58 opens away from the actuator 8 and provides a means for communicating fluid exteriorly of the valve in such a way as to keep clear from any electrical component included in the valve, such as the switch 46, thereby further adding to its enhanced safe operation.

The double block and vent assembly 28 includes a flow directing throat 52 disposed within the intermediate housing portion 22 and has a flow receiving end 51 and a flow discharge end 53 adjoined respectively with the inlet and outlet chambers 24,26. Secured to the depending end of the connecting member 14 and associated with the flow discharge end portion of the throat 52 is a first plug means 54 for controllably blocking fluid flow from within the assembly 28 and into the outlet chamber 26. A second plug means 56 is secured to the upper end of the shaft 58 and is associated with the flow receiving end portion of the throat for controllably blocking fluid flow into the assembly from the inlet chamber 24. For seating each of the first and second plug means in sealing engagement with the flow directing throat 52, a radially inwardly directed portion 62 is provided in the throat 52 and creates an annularly extending first abutment shoulder 64 against which the first plug means 54 is drawn under the bias of the helical compression spring 40. The second plug means 56 is in turn biased against a second annular shoulder 116 formed at the flow receiving end 51 of the throat 52 by the second compression spring 68 engaging at one of its ends with the second plug means 56 and at the other opposite one of its ends with the face 66. It should therefore be appreciated that the first and second plug means 54 and 56 are normally urged to a closed to flow condition by the respective compression springs associated with each of these means.

Figure 4:
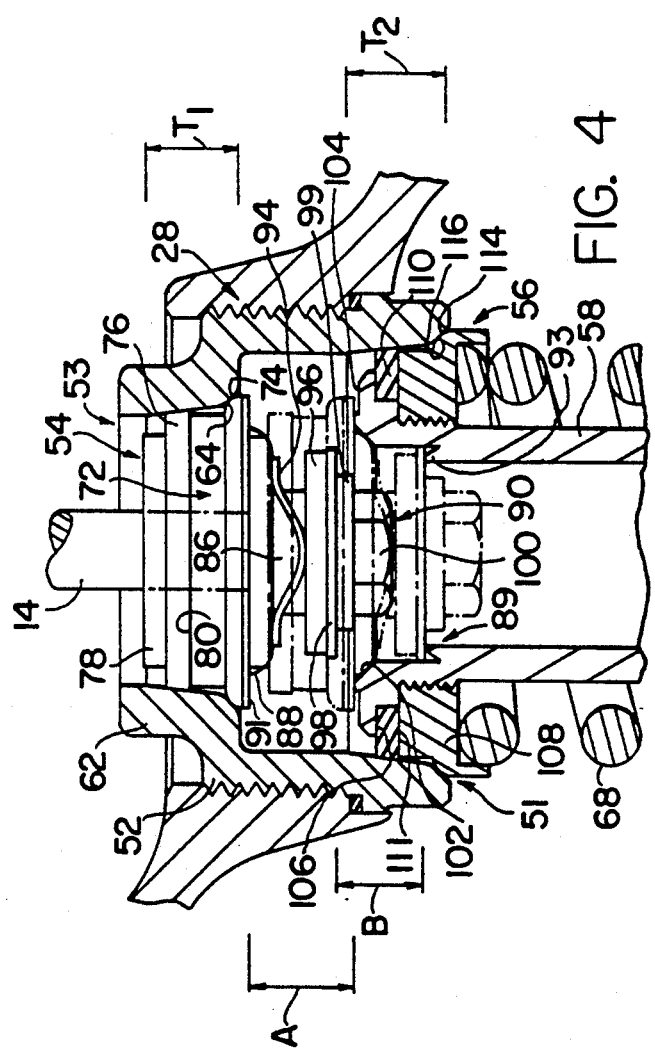
FIG. 4 shows in partial fragmentary vertical section an enlarged view of the flow directing throat with the first plug means shown seated in solid line and showing in phantom line the first plug means as it becomes seated in its intermediate position of FIG. 2.

Referring now to FIG. 4 and in particular to the configuration of the double block and vent assembly 28, it should be seen that the first and second plug means 54 and 56 are each so configured to engage with the assembly, and in the case of the first plug means also with the vent shaft 58, as to provide both hard and soft seal engagement against fluid flow through these passages when in a blocking condition. To this end, the first plug means 54 includes a fixed to the depending end of the connecting member 14 having an annular first chamfer 74 extending generally radially outwardly from the base of the body portion 72 so as to mate with the inversely confronting surface of the shoulder 64. Seated against the top surface 80 of the body portion 72 is a soft seal 76 captured between it and a supporting disc 78. The disc 78 is sized diametrically smaller than the underlying supporting surface 80, and the soft seal 76 is diametrically slightly larger than the underlying surface 80. The flow discharge end 53 of the throat 52 tapers along a length $T_1$ radially inwardly from a point adjacent the first shoulder 64 toward the outlet chamber 26. The material making up the soft seal 76 is thus compressed against the surface along length $T_1$ upon the continued bias of the compression spring 40 towards the outlet chamber 26. The taper along length $T_1$ forms an angle of about 5 degrees and the soft seal 76 may be formed from any number of resilient materials, but in the preferred embodiment the material is rubber. It should thus be appreciated that in its closed to flow condition as shown in the solid line in FIG. 4, the first plug means 54 is drawn upwardly through the radially inwardly directed portion 62 such that the soft seal 76 is compressed therein and through the coengagement between the first annular shoulder 64 and the first chamfer 74, the plug means 54 is positively held against further axial movement under the bias of the compression spring 40.

The first plug means 54 further includes a means disposed below the first chamfer 74 for coengaging with the upper end of the shaft 58 in a manner shown in phantom line in FIG. 4. This means includes a second annular chamfer 88 formed on the body portion 72 concentrically with and below the first annular chamfer 74 and includes a cylindrical boss 86 depending from the body portion 72. The boss 86 carries a means 90 for cooperating with a corresponding means 89 formed in the upper end of the shaft 58. The means 90 includes a biasing element 94, shown in the preferred embodiment, as a spring washer centered on and about the boss 86, second and third support discs 96 and 99, and a second soft seal 98. As will be seen, the boss 86 in addition to holding the spring washer 94, is sufficiently sized lengthwise to hold the support discs 96 and 99 such that they telescopically slide freely on it. The second soft seal 98 is supported on each of its sides against the engaging surfaces of the discs 96 and 99 which are together all clamped to the boss 86 by a bolt 100. It is to be noted here that the resiliency of the washer 94 is selected such that when the bolt is tightened, it applies an initial preload, yet allows for lost motion to occur between the seal 98 and the boss 86 upon the continued downward travel of the connecting member 14 as will hereinafter become apparent.

The cooperating means formed on the upper end of the shaft 58 includes a stepped opening defined initially by a tapered annular opening 102 directed radially inwardly from the end face of the shaft 58 and ending in an upwardly directed annular edge 93. The tapered opening 102 is sized and oriented relative to the second chamfer 88 to mate in sealing engagement with it. In addition to this, the surface 91 underlying the first chamfer 74 is so disposed on the body portion 72 that it seals with the end face of the vent shaft 58 simultaneously with the coengagement between the second chamfer 88 and the tapered opening 102 thereby providing two point contact between the coengaged surfaces when they are driven together.

The second plug means 56 is disposed on the upper end of the vent shaft 58 adjacent the cooperating means 89 and controllably blocks the flow of fluid to throat 52 when it is biased in its closed to flow condition. For this purpose the means 56 includes a generally annular lip 104 extending radially outwardly of the shaft 58 to define a shoulder 106, a collar piece 108 secured to the shaft and a third soft seal 110 clamped by the collar 108 therebetween. The third soft seal 110 extends diametrically annularly outwardly about the tube 58 a distance greater than that portion of the collar 108 which underlies it. Formed about the collar 108 is a radially outwardly directed fourth chamfer surface 114 facing the second annular shoulder 116. The inner surface of the flow directing throat 52 immediately communicating with the second shoulder 116 tapers slightly inwardly along a portion of its length at $T_2$ at an angle of approximately 5 degrees such that with the continued urging of the third soft seal 110 into the flow receiving end of the throat 52, the seal 110 is caused to be compressed against the tapering surface along length $T_2$ under the bias of the compression spring 68. The soft seal 110 is increasingly compressed in this manner until positive engagement between the third chamfer 114 and the shoulder 116 is made thereby providing a combined hard and soft seal. It should herein be appreciated that normally each end of the double block and vent assembly 28 is closed to flow under the urging of the first and second biasing means 40 and 68 acting respectively on each of the first and second plug means 54,56 and that it is only through the action of the actuator 8 that they are displaced.

The valve of the present invention is capable of three modes of operation as is apparent from FIGS. 1-3. In the first mode, illustrated by FIG. 1, the valve is closed and fluid is incapable of moving from the inlet chamber 24 to the outlet chamber 26 through the double block and vent assembly 28, but any fluid trapped within the assembly 28 is capable of being vented externally of the valve through the shaft 58.

In its second mode as illustrated by FIG. 2, the double block and vent assembly 28 as shown in phantom line in FIG. 4, is caused by the actuator 8 to be articulated such that the first plug means 54 is moved out of blocking coengagement with the throat 52 thereby resulting in the shaft being subsequently sealed by such continued movement. It is a feature of the present invention to first effect seating of the soft seal means 90 within the vent shaft 58 prior to hard seal engagement of the second chamfer 88 with the tapered opening 102. For this purpose, the first plug means 54 includes a lost motion feature associated with the soft seal 98 such that upon continued downward movement of the connecting member 14 the soft seal is caused to engage the upwardly directed annular edge 93 and remain in contact with it under the bias of the spring washer 94 rather than by direct application of the driving force imparted to the connecting member 14. That is, the first plug means 54 as measured from the second chamfer 88 travels a distance A before making hard contact with the tapered opening 102 in the vent shaft 58. Also, when both the first and second plug means 54 and 56 are in their normal closed to flow positions, the second soft seal 98 is spaced from the seating edge 93 a distance B shorter in length than distance A. Therefore, upon continued downward movement of the connecting member 14 the second soft seal 98 first contacts the seating edge 93 thereafter causing it to slide upon the boss 86 against the bias of the spring washer 94 until the second chamfer 88 seats on the tapered opening 102. This feature is important in that it provides the second soft seal 98 with a controlled bias protecting it against uncontrolled forces acting on it. The second mode also operates to seal the vent shaft 58 to a fluid passage in this manner such that any unvented gas remaining in the throat 52 is free to now pass upwardly through the radially inwardly directed portion 62 and into the outlet chamber 26.

In the third mode of operation, the coengaged connecting member 14 and the shaft 58 move in unison downwardly under the influence of the actuator 8 until the piston 16 reaches its lower limit. With this movement, the second plug means 56 as shown in FIG. 3 moves out of sealing engagement with the flow receiving end portion 51 of the flow directing throat 52. Here it should be appreciated that the net cross-sectional area of the opening created at the end portion 51 as taken across the annular shoulder 116 is selected such that the flow capacity through the receiving end of the throat is at least equal to that through the flow discharge end. As depicted in FIG. 3, the diameter D1 of the body portion 72 of the first plug means as measured across its widest dimension or diameter and the diameter D2 as measured across the second annular shoulder 114 are selected such that the effective area of the opening created is equal to or less than the area of the opening provided at the discharge end 53 of the throat as measured across the dimension D3. That is:

$$\frac{\pi D_3^2}{4} \geq \frac{\pi(D_2^2 - D_1^2)}{4}$$

or $$D_3^2 \geq D_2^2 - D_1^2$$

or $$D_3 \geq \sqrt{(D_2^2 - D_1^2)}$$

By so selecting these diameters, the present invention maintains laminar fluid flow through the throat 52. This result is further made possible by associating the larger diameter vent shaft 58 with the second plug means 56 thereby allowing the connecting member 14 to be diametrically downsized.

By the foregoing, a double block and vent valve has been described in the preferred embodiment. However numerous modifications and substitutions may be had without departing from the spirit of the invention. For example, rather than venting the breather opening 50 to atmosphere, it could alternatively be in communication with the vent shaft 58. Accordingly, the invention has been described by way of illustration rather than limitation.

I claim:

1. A double block and vent valve comprising:
    a housing having an inlet and an outlet for communicating fluid therethrough and being defined at its ends by a first portion and an opposite second portion, said inlet being associated with said housing second portion and said outlet being associated with said housing first portion;
    a flow directing throat disposed within said housing and interposed between said inlet and said outlet for communicating fluid therewith, said flow directing throat having a flow discharge end portion associated with said housing first portion and having an opposite flow receiving end portion associated with said housing second portion;
    a first plug means disposed within said housing and associated with said housing first portion for coengaging with the discharge end portion of said flow directing throat and for controllably blocking fluid flow from said throat to said outlet;
    a second plug means disposed within said housing and associated with said housing second portion for coengaging with the flow receiving end of said throat and for controllably blocking communication of fluid from said inlet into said flow receiving throat;
    first biasing means associated with said first plug means for urging said first plug means into blocking coengagement with said discharge end portion of said throat;
    second biasing means associated with said second plug means for urging said second plug means into blocking coengagement with said flow receiving end portion of said throat; and
    wherein the flow receiving end portion and said flow discharge end portion of said flow directing throat are sized cross-sectionally differently relative to one another such that fluid flowing through said flow directing throat from said inlet and to said outlet does so without being substantially impeded when passing through said throat.

2. A valve as defined in claim 1 further characterized in that said second plug means is disposed at one end of a hollow shaft slidingly received within said second portion of said valve.

3. A valve as defined in claim 2 further characterized in that an elongate connecting member is slidingly disposed within said first housing portion, said connecting member having a first end and an opposite second end; and
    wherein said first plug means is connected to said connecting member at its opposite second end.

4. A valve as defined in claim 3 further characterized in that said first plug means includes a body portion and a means depending therefrom for sealingly engaging with said hollow shaft; and said first end of said hollow shaft having means for receiving said means depending from said first plug means for causing sealing engagement therewith.

5. A valve as defined in claim 4 further characterized in that said flow discharge end portion of said flow directing throat is radially inwardly directed so as to form a first shoulder in said throat; and
said first plug means includes a first chamfer facing said housing first portion and being normally drawn against said first shoulder of said flow directing throat by said first biasing means.

6. A valve as defined in claim 5 further characterized in that said first plug means includes a first soft seal means disposed above said first chamfer and sized to be received generally within said radially inwardly directed portion of said flow directing float; and
wherein said radially inwardly directed portion of said throat tapers along a first length inwardly from said first shoulder towards said housing first portion.

7. A valve as defined in claim 6 further characterized in that said tapered surface along said first length of said radially inwardly directed portion of said flow directing throat is equal to approximately 5 degrees.

8. A valve as defined in claim 6 further characterized in that a second chamfer is disposed on said first plug means and faces said housing second portion;
said means formed on said hollow shaft for receiving said first plug means including a flared opening facing said second chamfer and communicating with a blind opening in said shaft ending in an upwardly directed annular edge; and
wherein said means depending from said first plug means for sealingly engaging with said hollow shaft includes a second soft seal for engaging with said upwardly directed seating edge formed in said hollow shaft.

9. A valve as defined in claim 8 further characterized in that said means depending from said first plug means for sealingly engaging with said hollow shaft further includes a boss depending from said body portion and extending from it below said second chamfer; and
said second soft seal being slidingly disposed on said boss and biased away from said second chamfer and towards said seating edge by a biasing means interposed therebetween.

10. A valve as defined in claim 9 further characterized in that said receiving end portion of said flow directing throat includes a second annular shoulder adapted for coengagement with said second plug means;
said second plug means including a third soft seal and a collar member secured together to said one end of said hollow shaft;
said flow receiving end portion of said throat further including a tapered surface extending along a second length therein; and
said collar having a second chamfer facing said second shoulder formed on said throat and said third soft seal means and said second chamfer being urged into sealing engagement respectively with each of said tapered surface of said second length and said second annular shoulder by said second biasing means.

11. A valve as defined in claim 10 further characterized in that said tapered surface along said second length tapers at an angle of approximately 5 degrees.

12. A valve as defined in claim 11 further characterized in that said housing is defined by a first housing part having a series of stepped openings formed therein;
one of said openings being sized to journal said connecting member therein for sliding engagement; and
wherein the remaining bores are adequately sized to receive said first biasing means therein.

13. A valve as defined in claim 12 further characterized in that said biasing means includes a helical compression spring housed within the remaining of said stepped openings not journalling said connecting member, said connecting member including a sealing piston cooperating within the opening farthest from said opening which journals said connecting member for sealing said housing first portion against fluid leaching.

14. A valve as defined in claim 13 further characterized in that the one of said stepped openings not journalling said connecting member and not receiving said sealing piston includes a breather opening communicating therewith; and
said opening journalling said connecting member including seal means at the interface between it and said discharge chamber thereby preventing passage of fluid into and through said series of stepped openings.

15. A valve as defined in claim 14 further characterized by an actuator secured against movement to the housing first portion;
said actuator having a moveable member coengaged with said connecting member for translatory movement therewith; and
means formed on said housing first portion and in said actuator for releasably securing said actuator to said valve.

16. A valve as defined in claim 12 further characterized in that adjacent said flared opening in said hollow shaft one end is disposed an annularly extending lip;
said third soft seal means being interposed between said collar and said lip; and
wherein the third soft seal means extends radially outwardly relative to said annular lip and the underlying surface of said collar to cause it to be compressed upon engagement with the tapered surface along the second length of the flow directing throat.

17. A valve as defined in claim 5 further characterized in that said first soft seal means is a generally flat member disposed on said first plug means between said body portion which underlies it and a seating disc; and
wherein said first soft seal means is formed from an elastomeric material and extends radially outwardly relative to the disc and the underlying body portion so as to cause the surrounding marginal edge portion of the first soft seal to become compressed upon engaging within the tapered surface along the first length of the radially inwardly directed portion of the throat.

18. A valve as defined in claim 8 further characterized in that said second soft seal means being disposed on said boss in a first given spatial relationship from said second chamfer corresponding to when said first plug means is out of engagement with said hollow shaft;
said second soft seal being spaced from said second chamfer a second given distance corresponding to when said second chamfer is in contact with said flared opening in said hollow shaft first end; and wherein the relationship between said first and second given distances and the range of travel of said first plug means from its initial blocking engagement within said throat being such as to cause said second soft seal to engage said upwardly extending seating edge seat formed in said hollow shaft and upon continued downward movement of said connecting member relative to said hollow shaft, said second soft seal becomes biased against said edge seat under the force of said biasing means interposed between it and said body portion and remaining compressed when said second chamfer positively engages on said flared opening formed in said hollow shaft.

19. A valve as defined in claim 18 further characterized in that said length of said connecting member and that of said hollow shaft being so related relative to the first and second plug means disposed thereon that when said actuator articulates said connecting member said connecting member causes said first plug means to open said discharge end portion of said throat and upon continued movement of said connecting member causes said second soft seal to seal said hollow shaft and subsequently move the hollow shaft together with the second plug means out of sealing engagement with the flow receiving end of the flow directing.

20. A valve as defined in claim 19 further characterized in that said first portion of said valve being disposed vertically upwardly of said second valve portion.

21. A valve as defined in claim 20 further characterized in that each of said first, second and third soft seals is comprised of a annular member made from an elastomeric material.

22. A valve as defined in claim 10 further characterized in that as measured diametrically across each of said first and second annular shoulders, said second annular shoulder is larger than said first annular shoulder.

* * * * *